Feb. 23, 1971 T. H. PECK 3,565,512
MICROSCOPE NOSEPIECE ASSEMBLY HAVING ADJUSTABLE
OPTICAL COMPONENTS
Filed April 29, 1969 2 Sheets-Sheet 1

THEODORE H. PECK
*INVENTOR.*

BY *Frank C. Parker*

ATTORNEY

Feb. 23, 1971 T. H. PECK 3,565,512
MICROSCOPE NOSEPIECE ASSEMBLY HAVING ADJUSTABLE
OPTICAL COMPONENTS
Filed April 29, 1969 2 Sheets-Sheet 2

THEODORE H. PECK
INVENTOR.

BY *Frank C. Parker*

ATTORNEY

United States Patent Office 3,565,512
Patented Feb. 23, 1971

3,565,512
MICROSCOPE NOSEPIECE ASSEMBLY HAVING ADJUSTABLE OPTICAL COMPONENTS
Theodore H. Peck, Irondequoit, N.Y., assignor to Bausch & Lomb Incorporated, Rochester, N.Y., a corporation of New York
Filed Apr. 29, 1969, Ser. No. 820,154
Int. Cl. G02b 7/02
U.S. Cl. 350—252                    5 Claims

ABSTRACT OF THE DISCLOSURE

A microscope nosepiece assembly which supports an auxiliary nosepiece lens in optical alignment with an objective, said assembly including mechanism for performing lateral and axial adjustments on said lens and/or objective to obtain and said alignment.

BACKGROUND OF THE INVENTION

In microscopes which utilize an auxiliary so-called nosepiece lens in conjunction with the accompanying objective, optical and mechanical problems arise in locating these optical components in alignment with each other and with the optical axis of the microscope. Alignment means for meeting this problem is strictly necessary in all high grade instruments and particularly in the type of microscope wherein the nosepiece assembly per se is supported on an individual support arm independently of the eyepiece or viewing supporting arm. Prior art does not present a satisfactory solution to the described problems.

SUMMARY OF THE INVENTION

The present invention relates to a microscope nosepiece assembly and are more particularly to mechanism for effecting alignment of the optical components contained in the assembly.

In view of the above stated problems it is an object of the present invention to provide a novel microscope nosepiece assembly which is producible by economical and well known manufacturing processes and is effective and rugged in performance.

It is a further object to provide such a device which affords longitudinal or axial as well as lateral adjusting movements for the optical components which are held in the assembly, the mechanism by which optical alignment of said components is secured being adjustable in a precise manner in steps so that the correct alignment of one component is used to test the alignment of another component.

A still further object is to provide such a device wherein objective holding mechanism may be preset to correct lateral adjustment ready to reecive any objective resulting in excellent optical alignment with other optical components of the microscope.

Further objects and advantages will be apparent in the invention by reference to the specification herebelow taken in connection with the accompanying drawings as described below.

DESCRIPTION OF ONE FORM OF THE INVENTION

Figure 1:
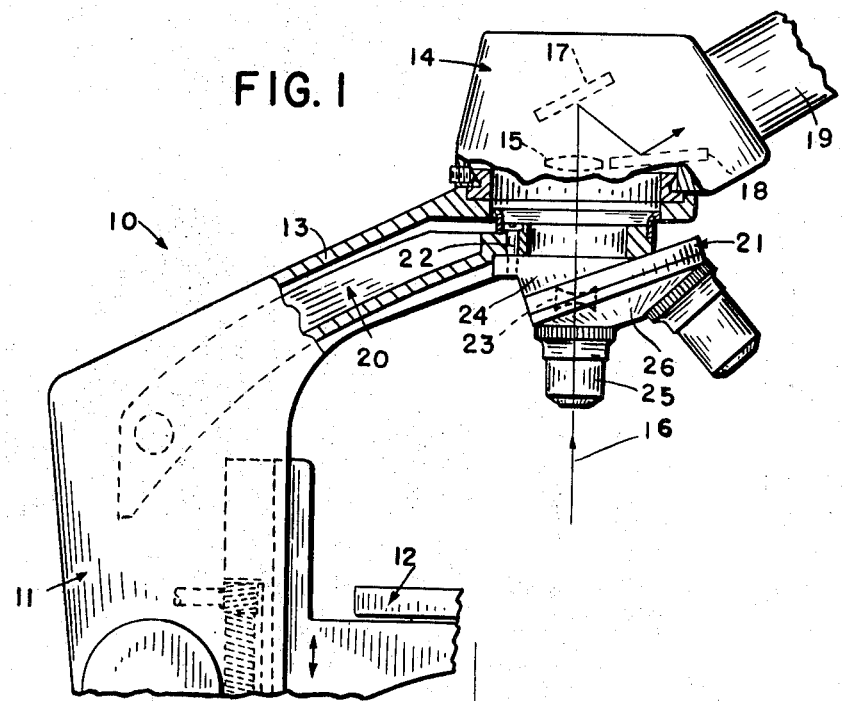
FIG. 1 is a side elevation at reduced scale of a microscope showing the invention taken in section and broken away for the sake of clarity.

A suitable style of microscope is shown in FIG. 1 embodying the invention, the microscope being generally designated by numeral 10. Comprised in the microscope 10 is an upright pillar 11 whereon a stage 12 is mounted in any desired manner. Formed on the upper end of the pillar 11 is a fixed integral arm 13 protruding over the stage 12, and carried thereon is an eyepiece assembly which is generally indicated by numeral 14. Said assembly 14 may contain a relay lens 15 having an optical axis 16 which coincides with the optical axis of the microscope and is similarly numbered. The eyepiece assembly 14 also comprises the deviation mirrors 17 and 18 and an eyepiece not shown which is secured in the eyepiece tube 19.

Fixed within a hollow portion of the integral arm 13 is an independent cantilever arm 20 which is securely anchored in the pillar 11 by means not shown and at its outer end freely supports a nosepiece assembly which is generally designated by numeral 21, said assembly being attached thereto by a plurality of screws, one of which is shown at 22.

According to the present invention, an auxiliary or nosepiece lens 23 is held in a stationary body member 24 of the assembly 21 and another object 25 is carried in a rotatable nosepiece 26 which is pivoted on an axle stud 27 secured in the body member, the aforementioned lateral and longitudinal adjusting mechanism being necessary to properly align all of the optical components, at least those which are carried by the nosepiece assembly 21.

Figure 2:
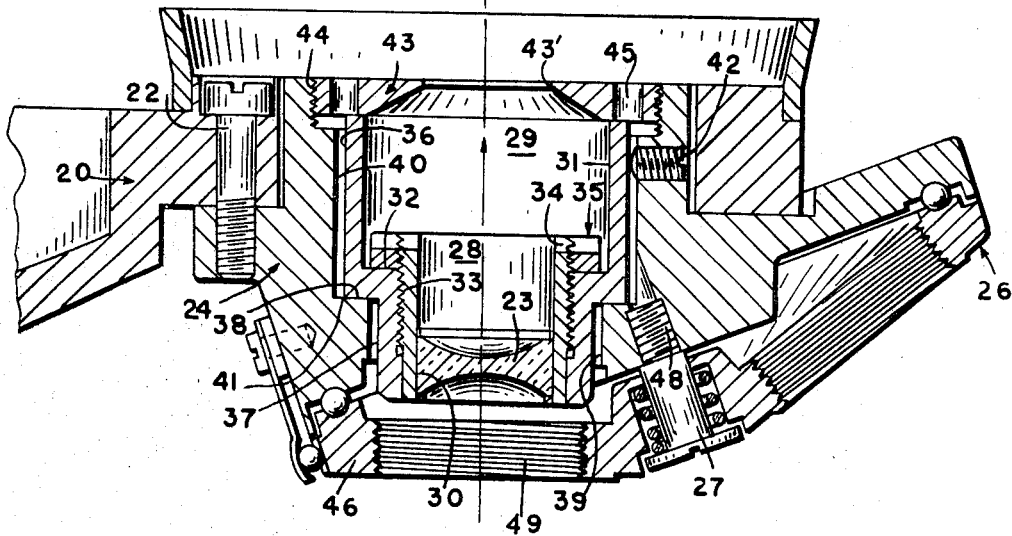
FIG. 2 is an enlarged mid-sectional view of the adjusting mechanism of the invention which is contained in the nosepiece assembly.

One form of the novel adjusting mechaism is shown in FIG. 2 wherein the so-called nosepiece lens 23 is fixed in any suitable manner in a lens cell 28. The lens cell 28 is mounted in a lens carrier sleeve 29 which has a bore 30 formed in its lower part and a counterbore 31 in its upper part which are joined together by the radial shoulder 32.

In order to provide focusing or axial motion for the lens cell 28, the outer surface of the cell and the bore 30 are slidably fitted together and have interengaging threads 33 formed thereon, and raidal slots 34 are formed in the top portion of the cell so that it may be rotated. For locking the lens cell 28 in adjusted position, a lock ring 35 is threaded onto the threads 33 of the cell and the ring is tightened firmly against the radial shoulder 32.

Lateral adjustment of the lens cell 28 is secured by forming a large outer crlindrical surface 36 and a smaller outer cylindrical surface 37 in tandem to each other on the lens carrier sleeve 29 and forming a radial annular surface 38 connecting the tandem cylindrical surfaces. Furthermore, a socket is formed in the body member 24 for receiving the sleeve 29, said socket being formed by providing a bore 39 in the lower part of member 24 of a size considerably larger than the diameter of the adjacent cylindrical surface 37. Likewise a counterbore 40 is formed in tandem with the bore 39 in the upper part of the body member 24, the counterbore terminating in a radial shoulder 41 which connects with the bore 39. Both the bore 39 and the counterbore 40 are enough larger in diameter than the adjacent walls of the carrier sleeve 29 so that there is free lateral adjusting movement available between the adjacent walls of the sleeve and socket, the radial surface 38 being seated upon the radial shoulder 41.

Lateral movement of the lens carrier sleeve 29 is facilitated by providing a series of at least three radial and angularly adjusting set screws, one of which is shown at 42 threaded through the wall of the body member and bearing on the sidewall 36 of the carrier sleeve 29.

Means for locking the lens carrier sleeve 29 in adjusted lateral position is provided comprising a disc-like locking member 43 which has threads 44 formed on its outer diameter, said threads engaging with mating threads formed adjacent the top of counterbore 40 in the body member 24. The locking member 43 is apertured at 43′ to control stray light and may be rotated by providing a wrench hold, such as the spanner wrench holes 45 for instance, into which the wrench is inserted.

A rotatable plural-objective nosepiece shell 46 is provided in the nosepiece assembly 26 which rotates about an axle or pivot stud 27. The stud has a threaded portion 48 which engages in a tapped hole in the body member 24 according to well known construction as shown in FIG. 2 and the aforementioned objective 25 is secured in an opening in said shell by the standard threads 49 formed therein.

Figure 3:
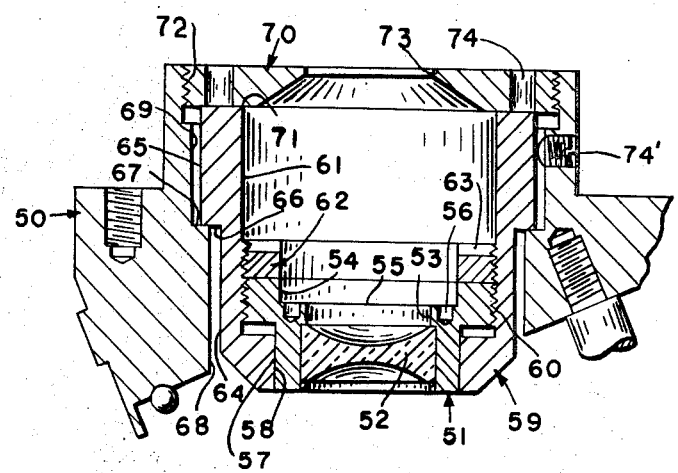
FIG. 3 is an enlarged and simplified mid-sectional view of another form of the invention.

Another form of the invention is shown in FIG. 3 of the drawings wherein a body member 50 is shown, a part thereof being broken away. A lens cell 51 is provided wherein an auxiliary or nosepiece lens 52 is fixed in any desired manner such as cementing. The inside walls of the lens cell 51 are formed by a bore 53 and a contiguous tandem counterbore 54 of larger diameter and these surfaces are joined together by a radial shoulder or ledge 55. In the ledge a pair of spanner wrench holes 56 are formed whereby the cell may be rotated for a purpose to be explained hereinafter.

A smooth cylindricol outer surface 57 is formed on the lower part of lens cell 51 which is fitted for relative sliding motion into a smooth bore 58 which is formed in the lower part of a lens carrier sleeve 59. On the upper part of the lens cell 51 an enlarged diameter is provided whereon threads 60 are formed, and companion threads are formed in the lower part of a counterbore 61 which is formed in a major portion of the sleeve 59, the axial position of the lens cell 51 being smoothly adjustable by threads 60 by rotating the cell with a spanner wrench as aforementioned.

For locking the lens cell 51 in any desired axial position in the lens carrier sleeve 59, the threads 60 are extended along the counterbore 61 so as to accommodate an annular locknut 62 which is provided with a pair of wrench slots 63 in its upper surface whereby the locknut may be forced against the lens cell 51 by a suitable wrench. Axial adjustments which are permitted by the above described mechanism are necessary to compensate for manufacturing allowances in the focal lengths of the component optical members.

In order to provide relative lateral adjustments for the lens cell 51 to align portions of the optical axis 16, the outer diameter of the lens carrier sleeve 59 is formed on its lower part with a smaller cylindrical surface 64 and an upper larger cylindrical surface 65 which both meet at an intervening radial annular surface 66. The radial surface 66 rests on a radial shoulder 67 formed in the body member 50 by providing a bore 68 therein which terminates at the shoulder on the lower side and further providing a larger diametered counterbore 69 above the shoulder. Both the counterbore 69 and bore 68 in the body member are amply spaced away from the opposing surfaces 65 and 64 respectively to permit the sleeve to shift laterally considerably on the shoulder 67.

Means are provided to lock the lens carrying sleeve 59 in laterally adjusted position by a flat lock ring 70 which is forced downwardly against the top lip 71 of the carrier sleeve and for this purpose coacting threads 72 are formed on the rim of the lock ring 70 and in the counterbore 69. A light controlling aperture 73 is formed centrally through the lock ring 70 for controlling stray light. Rotation of the lock ring 70 is facilitated by provision of spanner wrench holes 74 in which the wrench engages to turn the ring.

Means are also provided for moving the lens carrier sleeve 59 laterally during the adjusting operation by installing at least three angularly spaced adjusting set screws 74′ through the body member 50 and contacting the surface 65 of the sleeve.

Figure 4:
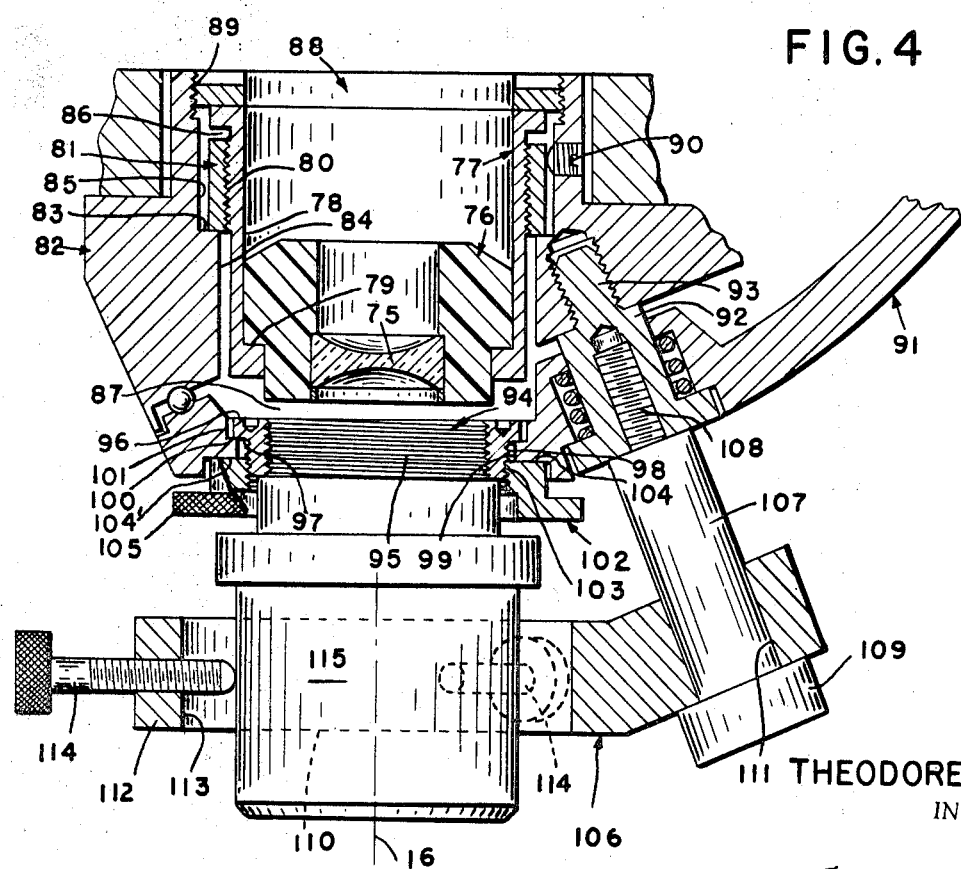
FIG. 4 is a mid-sectional view drawn at an enlarged scale of still another form of the invention illustrating the alignment of an auxiliary nosepiece lens with an objective.

A form of the invention is shown in FIG. 4 which is particularly adapted to dark field illumination and accordingly has an auxiliary or nosepiece lens 75 which is solidly mounted in any desirable manner such as cementing into an annular light conducting ring-like member 76 which serves as a lens cell. The light conducting member 76 is cemented into the bottom part of a lens carrier sleeve 77 which has the distinction of being movable laterally and axially to adjust optical alignment and optical focus respectively.

Accordingly a cylindrical wall 78 is provided to which the light conducting member 76 is fitted and a narrow ledge 79 is formed at the bottom of the sleeve 77 whereon the member rests. On the upper part of the exterior of the cylindrical wall 78 a thread 80 is formed whereon a load bearing ring 81 is threaded for lengthwise adjustment along the sleeve 77.

A body member 82 is provided similar in general construction to the other forms of the invention, said member having a supporting radial shoulder 83 formed at the junction of a bore 84 and a counterbore at 85. The outer surface of the wall 78 of the lens carrying sleeve 77 as shown in FIG. 4 is much smaller in diameter than the bore 84 and likewise the outer diameter of the load ring 81 is correspondingly smaller than the counterbore 85 so that ample lateral movement of the sleeve in the body member is possible. Also clearance 86 and lower clearance 87 are necessary to assure ample axial adjustment of the lens 75. Similar to the other forms of the invention, a lock ring 88 is provided which frictionally holds the carrier sleeve 77 in adjusted position laterally and longitudinally, the outer diameter of the lock ring being threaded at 89 and the adjacent body member 82 being tapped to fit the thread. A plurality of angularly spaced adjusting set screws 90 are installed in the body member 82 so as to bear against the outer surface of the load ring 81 to force the sleeve 77 along the shoulder 83 during said lateral adjustment.

In FIG. 4 a mechanism is shown whereby the lateral adjustment of the mechanism which receives the microscope objective may be accurately laterally preset so as to assure excellent optical alignment of any chosen objective with the other optical members of the microscope.

A nosepiece shell 91 is pivotally mounted on the body member 82 by means of a pivot member 92 which is anchored by a threaded stud 93 in a tapped hole in the body member. A ring-like objective carrier member 94 is provided having a standard interior thread 95 wherein a plurality of different powered objectives are adapted to be held. Said carrier member 94 has a radial flange 96 formed around the top portion thereof and on the lower side of said flange a radial annular surface 97 truly square with the interior thread 95 is formed.

The interior thread 95 on the objective carrier ring 94 extends through a shank having an exterior thread 98 of very fine pitch formed thereon. Said shank extends through a bore 99 in nosepiece shell 91 and the bore is smaller than the outer diameter of the flange 96 but considerably larger than the largest diameter of the thread 98 to allow relative lateral movement therebetween. To support the carrier ring 94 and the objective held therein, an annular shoulder 100 is provided in the nosepiece shell 91 wherein said ring rests, said shell being counterbored at 101 above the shoulder to a diameter considerably larger than the outer diameter of the radial flange 96 so as to facilitate lateral motion of the carrier ring in the shell.

Locking of the carrier ring 94 in correct laterally adjusted position is afforded by a finger-operated clamp ring 102 having an interior surface on which a fine thread 103 is formed to match thread 98 on the carrier ring. A flat annular radial contact surface 104 larger than said clamp ring is formed in the nosepiece shell 91 against which the uppermost surface 104' of the clamp ring 102 is drawn by rotation thereof. Around the lower portion of the clamp ring a wide knurled flange 105 is formed to facilitate the rotation of the clamp ring. It is understood that the engaging threads 98 and 103 which apply the clamping pressure are carefully smoothly formed and impart no appreciable frictional drag which might tend to turn the objective carrier member 94 during tightening of the clamp ring.

THE ALIGNMENT FIXTURE

The above described structure permits lateral adjustments to be made to the objective holding member 94 while the clamping pressure is comparatively light and a fixture for easily and accurately accomplishing said lateral adjustment is described herebelow representing one effective way of proceeding.

In the adjustment fixture, generally designated by numeral 106 as shown in FIG. 4, a support stud 107 is provided having a reduced diameter pilot 108 on which a thread is formed, said pilot engaging in a tapped hole provided in the pivot member 92. Stud 107 has an enlarged head 109 formed thereon on which a cross frame 110 hangs, the frame having a bore 111 formed therein which fits the stud 107.

The frame 110 is provided with a circular ring portion 112 positioned below and substantially concentric with the objective carrier ring 94, and a large central opening 113 is provided in said ring portion. Three radially directed adjustment screws, one of which is shown by numeral 114, are provided in the frame 110 for a purpose mentioned hereinafter.

Preparatory to laterally adjusting the objective carrier member 94 in the nosepiece shell 91, an objective 115 is screwed into the lower part of the fine threads 103 and a test pattern located beneath the objective is viewed through the eyepiece of the microscope. With the clamp ring 102 lightly contacting the radial contact surface 104 the objective 115 is moved laterally by proper manipulation of the adjustive screws 114 until the proper centration is achieved and then the knurled clamp ring 102 is tightened. Then the adjustment fixture 106 is dismounted and put aside.

It will be apparent from the foregoing description that the present invention provides a simple and inexpensive mounting and adjustment mechanism for the objective and adjacent nosepiece lens of a microscope, said mechanism nevertheless being reliable and sturdy in structure and accurate and versatile in operation, all of which is provided in fulfillment of the objects of this invention. Although only certain forms of the invention have been shown and described in detail herein, other forms are possible and changes may be made in the form and arrangement of the parts and in the details of construction thereof without departing from the spirit of the invention as defined in the following claims.

I claim:

1. In a microscope objective mounting nosepiece having a nosepiece lens mounted therein rearwardly of said objective, said nosepiece further having mechanism for laterally and longitudinally adjusting said lens comprising a stationary body member, a lens carrier sleeve characterized by two concentric and tandem outer cylindrical walls of different diameter which are joined together by a first radial shoulder, a first pair of concentric and tandem cylindrical surfaces joined together by a second radial shoulder to define a bore in said sleeve, a socket for receiving said sleeve characterized by two other concentric and tandem cylindrical surfaces which are freely spaced from said outer cylindrical walls to allow motion therebetween and are joined together by a radial annular surface which lies in contact with said shoulder, a lens cell wherein said nosepiece lens is fixed, an inclined connection formed cooperatively on the smaller cylindrical surface of said bore and on the outer surface of said lens cell for effecting longitudinal translation upon relative rotation therebetween, means for locking said connection in any adjusted longitudinal position of said cell, and second locking means carried by said body member and bearing forcibly against the upper end of said carrier sleeve so as to force said radial shoulder against said radial annular surface to frictionally maintain its lateral position in said socket.

2. In a microscope objective mounting nosepiece having a nosepiece lens mounted therein rearwardly of said objective, said nosepiece further having mechanism for laterally and longitudinally adjusting said lens comprising a stationary body member, a lens carrier sleeve characterized by two concentric and tandem cylindrical walls of different diameter which are joined together by a first radial shoulder, a first pair of concentric and tandem cylindrical surfaces joined together by a second radial shoulder to define a bore in said sleeve, a socket for receiving said sleeve characterized by two other concentric and tandem cylindrical surfaces which are freely spaced from said cylindrical walls to allow motion therebetween and are joined together by a radial annular surface which lies in contact with said shoulder, a lens cell wherein said nosepiece lens is fixed, an inclined connection formed cooperatively on the smaller cylindrical surface of said bore and on the outer surface of said lens cell for effecting longitudinal translation upon relative rotation therebetween, means for locking said connection in any adjusted longitudinal position, means formed in said lens cell for rotating said cell to affect said adjustment, means for locking said connection after longitudinal adjustment, and means seated in said body member and bearing forcibly on said lens carrier sleeve to hold said sleeve in adjusted lateral position within said socket.

3. In a dark field microscope having a revolving nosepiece and an auxiliary lens mounted adjacent to and aligned with said nosepiece, mechanism for laterally and longitudinally adjusting the position of said lens comprising a stationary body member wherein a socket is formed by two concentric and tandem cylindrical surfaces of different diameters which are joined together by a radial shoulder, a lens carrier sleeve wherein said lens is fixed, said sleeve having an extended cylindrical outer surface which is free of the adjacent surfaces of the socket so as to permit relative lateral translation thereto, a longitudinal adjustment collar carried on said extended outer surface of said sleeve and seated against said shoulder, thread means cooperatively formed on said outer surface and said collar for providing relative longitudinal motion between said lens and body member, and a lock ring threaded into the upper end of the socket wall and means for forcing said ring against the upper end of said sleeve to longitudinally and laterally lock the sleeve in adjusted position in the body member.

4. In a microscope revolving nosepiece assembly including an auxiliary nosepiece lens and an objective mounted therein, mechanism for laterally and/or longitudinally adjusting the position of said lens and objective, said mechanism having in combination a stationary body member, a lens carrier sleeve for supporting said lens, means for mounting said sleeve for lateral motion in said body, a lens cell is which said lens is fixed, said cell being fitted for longitudinal movement within said sleeve, an annular shoulder formed on said body member adjacent to said sleeve, second means cooperatively formed on an outer cylindrical surface of said sleeve and on an annular member carried by the sleeve ad abutting against said shoulder for longitudinally moving said cell, an objective holding ring threaded on its inner surface to fit an objective and having a second thread formed on an outer surface thereof, an objective carrying nosepiece shell and means for pivoting said shell on said body member, a cylindrical surface defining a bore which is formed through said shell and freely fitting said ring so that it is movable laterally therein, an upper annular and radial seating surface formed on said shell around said bore whereon said ring rests, a second annular radial surface formed around said bore on the lower side of said shell, and a clamping ring having an inner thread engaged with said second thread on the objective holding ring and engageable against said second radial surface upon tightening of the threads to clamp said ring securely after aligning said ring to said auxiliary lens.

5. Laterally and axially adjustable mounting mechanism for an optical member in an optical instrument comprising:

(a) a tubular member having a longitudinal axis and having means on the interior thereof for receiving said optical member in substantial alignment with the longitudinal axis of said tubular member, said tubular member having inclined threads on its exterior, said exterior of said tubular member being of diameter $D_1$, and said tubular member having a surface at one end transverse to said longitudinal axis;

(b) a first clamp ring having a longitudinal axis and threads on its interior cooperative with said inclined threads of the exterior of said tubular member for axial adjustment of focus in said instrument of said optical member, and having a surface at one end of said first clamp ring transverse to said longitudinal axis, the exterior of said first clamp ring being of a diameter $D_2$ larger than said diameter $D_1$;

(c) a body member defining therein a bore having walls forming first and second tandem cylinders concentric about a mutual longitudinal axis, said first and second concentric cylinders being joined by a radial shoulder having a surface transverse to said longitudinal axis, said first concentric cylinder having an inside diameter $D_3$ larger than the diameter $D_2$ of said exterior of said first clamp ring for receiving said first clamp ring and said second concentric cylinder having an inside diameter $D_4$ smaller than said diameters $D_2$ and $D_3$, but larger than said diameter $D_1$ of said tubular member for receiving said tubular member, and said body member having inclined threads within said first concentric cylinder; and (d) a second clamp ring having a longitudinal axis and threads on its exterior cooperative with said inclined threads within said first concentric cylinder of said body member and having a surface at one end of said second clamp ring transverse to said longitudinal axis;

whereby said first clamp ring may be threadedly mounted upon said tubular member for adjustably resting said transverse surface of said first clamp ring upon said radial shoulder of said body member for lateral adjustment of said optical member within said instrument and said second clamp ring may be threadedly mounted upon said body member for clamping said transverse surface of said second clamp ring against said transverse surface of said tubular member.

References Cited

UNITED STATES PATENTS

| | | | |
|---|---|---|---|
| 1,167,164 | 1/1916 | Grebe | 350—255UX |
| 1,729,690 | 10/1929 | Sloan | 350—254 |
| 2,173,657 | 9/1939 | Ott et al. | 350—247 |
| 2,523,067 | 9/1950 | Sherry | 350—254 |
| 3,471,220 | 10/1969 | Clark et al. | 350—39X |

DAVID SCHONBERG, Primary Examiner

T. H. KUSMER, Assistant Examiner

U.S. Cl. X.R.

350—39, 54, 254, 257